F. H. STANWOOD.
NON-SLIPPING TREAD.
APPLICATION FILED NOV. 22, 1915.
1,185,445.
Patented May 30, 1916.
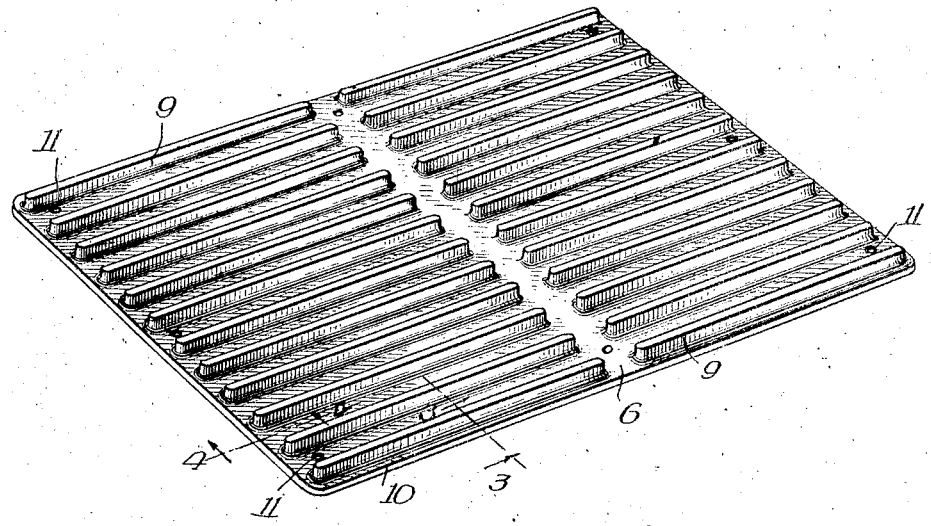
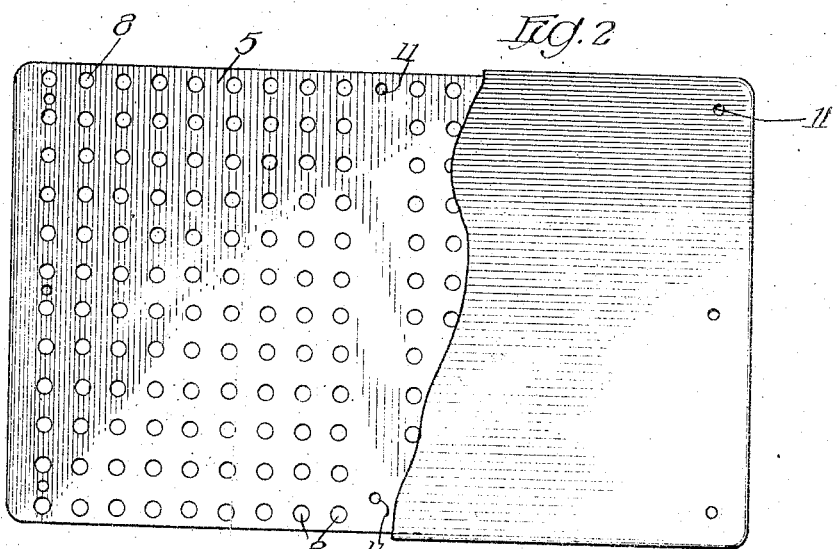
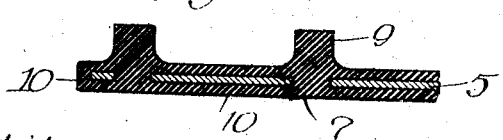
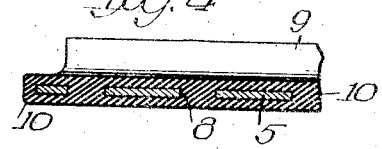
Witnesses:
Inventor
Frank H. Stanwood
By Munday Evarts Adcock & Clarke
Attys

UNITED STATES PATENT OFFICE.

FRANK H. STANWOOD, OF ARLINGTON, MASSACHUSETTS, ASSIGNOR TO STANWOOD EQUIPMENT COMPANY, A CORPORATION OF MAINE.

NON-SLIPPING TREAD.

1,185,445.   Specification of Letters Patent.   Patented May 30, 1916.

Application filed November 22, 1915. Serial No. 62,748.

*To all whom it may concern:*

Be it known that I, FRANK H. STANWOOD, a citizen of the United States, residing in Arlington, in the county of Middlesex and State of Massachusetts, have invented a new and useful Improvement in Non-Slipping Treads, of which the following is a specification.

This invention relates in general to non-slipping treads for use in step or walking surfaces, such as stair-steps, walks, runways and the like, a particular use of the invention, however, being in connection with running-boards for automobiles and other vehicles, although it will be manifest as the invention is better understood that it has a much wider and broader application.

A principal object of my invention is the provision of a non-slipping tread for automobiles and the like, which may be supplied to the automobile maker or user in the units ready for instant application, requiring only the fastening of the unit in desired location.

A further object of my invention is the provision of such an article which when positioned on the running-board of an automobile will not extend above its normal surface an appreciable distance, or far enough to permit persons stepping into the automobile to stumble over it.

A still further object of the invention is the provision of such an article in which no metal parts will be exposed, rendering it impervious to the action of moisture and dampness.

Another object of the invention is the provision of a non-slipping tread of the character described of reinforce non-slipping material, the reinforcing element of the same being so constructed and arranged as to prevent its having any tendency to wear into or otherwise damage the non-slipping material.

Still another object of the invention is the provision of such an article which while being of rigid construction, can be relied upon to lie close to the running-board or other surface and to prevent any dirt or moisture collecting beneath it.

A still further object of the invention is the provision of such an article combining high efficiency and durability with cheapness and pleasing appearance.

Other objects and advantages of the invention will be apparent as it is better understood from the following description when considered in connection with the accompanying drawing illustrating a preferred embodiment thereof.

Referring to the drawing, Figure 1 is a perspective view of a non-slipping tread unit embodying my present invention; Fig. 2 is a bottom plan view of the same with a portion broken away and removed to more completely disclose certain details of construction; Fig. 3 is a partial section taken on the line 3—3 of Fig. 1; and Fig. 4 is a similar view taken on the line 4—4 of Fig. 1.

For the purpose of illustrating my invention I have shown on the drawing a unit of general rectangular form. This unit consists in the present instance of a reinforcing sheet 5 having a coating 6 upon its upper face and a coating 7 on its under face, both of cushioning and non-slipping material or materials, rubber preferably being used for this purpose. The reinforce 5 consists of a rigid metallic plate provided with rows of perforations 8, these rows in the present instance being arranged in two series, each series consisting of a number of rows disposed in parallelism and extending from one side of the plate to the other.

The coatings 6 and 7 form what may, for certain purposes of the invention, be considered the body of the tread, and these coatings are joined through the perforations 8 so that the upper coating and the lower coating form a part of a single mass. The lower coating 7 is of even thickness throughout and the upper coating is formed with a plurality of ribs 9 arranged in two series, each rib 9 extending above and over a row of perforations 8 so that the ribs on the upper side of the plate extend through the perforations and form a part of the under coating of non-slipping material. The coatings 6 and 7 are joined also about their edges at 10 around the entire thread, embedding the reinforce in the non-slipping material and wholly protecting it from atmospheric moisture and other external corroding action. The apertures 8 are preferably of diameter substantially equal to the width of the ribs above them. The plate 5 is provided also with a number of apertures 11 which extend also through the coatings 6 and 7 and which are adapted for the reception of fastening screws or other members provided to secure the unit in place upon a running-board or any other desired location. The upper surface of the coating 8 aside from the roughening effect given it through the provision of the ribs 9 is smooth, thus providing smooth channels between the ribs and between the two series of ribs shown in order that the tread unit may be readily cleaned and also in order to prevent it accumulating matter which will be unhygenic.

It will be manifest that the ribs 9 need not extend sufficiently above the surface of the running-board to enable anyone entering the automobile to stumble should their attention be directed elsewhere. The unit may be constructed by merely placing the metal sheet or reinforce in a mold with a suitable quantity of rubber or other composition adapted for the purpose and subjecting the molds to the usual treatment employed in the making of soft rubber articles.

It will be manifest also that the apertures 8 when properly formed will leave no roughened edges to eat into the material of the coating 6 and 7 in use, and that the soft undercoating will permit the plate when screwed down tightly to rest in intimate contact with the running-board so that no dirt or moisture can collect beneath the tread.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A non-slipping tread, comprising an internal metal body plate having a plurality of spaced rows of perforations therethrough, and non-slipping, non-metallic material molded about said plate and through said perforations and having an elongated rib located above each of said rows of perforations, said plate having screw receiving openings and being otherwise imperforate between said elongated ribs.

2. A non-slipping tread, comprising an internal rigid metal body plate formed with rows of perforations to be filled by the non-slipping, non-metallic material and having perforations for fastening screws, and a surrounding metal body of non-slipping material, the same being applied below and above the body plate and having integral parts in said first mentioned rows of perforations and being formed with openings in line with the second mentioned securing perforations, said non-slipping body being formed on its top surface with projecting ribs in line above said rows of perforations.

In testimony whereof, I have hereunto set my hand in the presence of two subscribing witnesses.

FRANK H. STANWOOD.

Witnesses:
J. C. CARPENTER,
THOS. J. O'BRIEN.